US012155996B2

(12) United States Patent
Lisle et al.

(10) Patent No.: US 12,155,996 B2

(45) **Date of Patent: *Nov. 26, 2024**

(54) ELECTROSTATIC TRANSDUCER AND DIAPHRAGM

(71) Applicant: WARWICK ACOUSTICS LIMITED, Nuneaton (GB)

(72) Inventors: Benjamin Martin Lisle, Staffordshire (GB); Julian David Fordham, Northamptonshire (GB); James Hedges, Derby (GB); David Rhys Lewis, Bridgend (GB)

(73) Assignee: WARWICK ACOUSTICS LIMITED, Nuneaton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,092

(22) Filed: Sep. 14, 2023

(65) Prior Publication Data

US 2023/0421967 A1 Dec. 28, 2023

Related U.S. Application Data

(63) Continuation of application No. 17/595,011, filed as application No. PCT/GB2020/051134 on May 7, 2020, now Pat. No. 11,825,265.

(30) Foreign Application Priority Data

May 7, 2019 (GB) ..................................... 1906425

(51) Int. Cl.
*H04R 19/02* (2006.01)
*H04R 7/10* (2006.01)

(52) U.S. Cl.
CPC ............... *H04R 19/02* (2013.01); *H04R 7/10* (2013.01); *H04R 2307/025* (2013.01)

(58) Field of Classification Search
CPC .... H04R 7/10; H04R 2307/025; H04R 19/00; H04R 3/06
See application file for complete search history.

(56) References Cited

U.S. PATENT DOCUMENTS 3,895,193 A 7/1975 Bobb
3,908,098 A 9/1975 Kawakami et al.
(Continued)

FOREIGN PATENT DOCUMENTS

CA 2195442 A1 2/1996
CN 1333993 A 1/2002
(Continued)

OTHER PUBLICATIONS

United Kingdom Search Report regarding Application No. GB1906425.2 on Jan. 15, 2020.
(Continued)

*Primary Examiner* — Sunita Joshi
(74) *Attorney, Agent, or Firm* — Harness, Dickey & Pierce, P.L.C.

(57) ABSTRACT

An electrostatic transducer, a diaphragm (2) therefor, and corresponding methods of manufacture are disclosed. The electrostatic transducer is preferably for use in a motor vehicle. A composite laminated diaphragm (2) is manufactured by providing a first insulating layer (4), providing a conductive layer (6) on a surface of the first insulating layer (4), and bonding a second insulating layer (10) to the conductive layer (6) such that the second insulating layer (10) extends over the conductive layer (6). The first and second insulating layers (4, 10) each comprise a sheet of uncharged insulating material. The thickness of the composite laminated diaphragm (2) is less than 20 μm. Manufacturing the electrostatic transducer comprises securing a first conductive stator, a first insulating spacer and the diaphragm (2) in a stack with the first insulating spacer
(Continued)

between the first conductive stator and the diaphragm (2) to provide a spacing of less than 1 mm between the first conductive stator and the diaphragm (2).

19 Claims, 4 Drawing Sheets

(56) References Cited

U.S. PATENT DOCUMENTS

| | | | | |
|---|---|---|---|---|
| 3,935,397 | A | 1/1976 | West | |
| 3,942,029 | A | 3/1976 | Kawakami et al. | |
| 3,992,585 | A | 11/1976 | Turner et al. | |
| 4,533,794 | A | 8/1985 | Beveridge | |
| 5,161,128 | A | 11/1992 | Kenney | |
| 5,471,540 | A | 11/1995 | Maeda | |
| 5,600,610 | A * | 2/1997 | Hill | H04R 19/00 381/174 |
| 6,044,160 | A | 3/2000 | Norris | |
| 6,201,874 | B1 | 3/2001 | Croft, III et al. | |
| 6,628,791 | B1 | 9/2003 | Bank et al. | |
| 7,076,070 | B2 | 7/2006 | Pearce et al. | |
| 7,095,864 | B1 | 8/2006 | Billson et al. | |
| 8,416,973 | B2 | 4/2013 | Medley et al. | |
| 9,503,821 | B2 | 11/2016 | Atkins et al. | |
| 9,692,372 | B2 | 6/2017 | Atkins et al. | |
| 2002/0135272 | A1 | 9/2002 | Toda | |
| 2002/0141606 | A1 | 10/2002 | Schweder et al. | |
| 2003/0123683 | A1 | 7/2003 | Raicevich | |
| 2006/0208609 | A1 | 9/2006 | Heim | |
| 2007/0029899 | A1 | 2/2007 | Matsuzawa | |
| 2007/0121970 | A1 | 5/2007 | Miyazaki | |
| 2007/0124620 | A1 | 5/2007 | Miyazaki | |
| 2007/0127746 | A1 * | 6/2007 | Matsuzawa | B06B 1/0292 381/152 |
| 2007/0189559 | A1 | 8/2007 | Haan et al. | |
| 2009/0016551 | A1 | 1/2009 | Chiang et al. | |
| 2009/0041266 | A1 | 2/2009 | Guo et al. | |
| 2009/0278217 | A1 | 11/2009 | Laming et al. | |
| 2009/0304212 | A1 | 12/2009 | Han et al. | |
| 2010/0135519 | A1 | 6/2010 | Werners et al. | |
| 2012/0014543 | A1 | 1/2012 | Chiang et al. | |
| 2012/0237069 | A1 | 9/2012 | Harman | |
| 2013/0044905 | A1 | 2/2013 | Lee et al. | |
| 2014/0232236 | A1 | 8/2014 | Atkins et al. | |
| 2017/0171668 | A1 | 6/2017 | Billson et al. | |
| 2017/0171669 | A1 | 6/2017 | Billson et al. | |

FOREIGN PATENT DOCUMENTS

| | | | | |
|---|---|---|---|---|
| CN | 101256900 | A | 9/2008 | |
| CN | 101346015 | A | 1/2009 | |
| CN | 101395957 | A | 3/2009 | |
| CN | 101651915 | A | 2/2010 | |
| CN | 201657310 | U | 11/2010 | |
| CN | 102355619 | A | 2/2012 | |
| CN | 103843369 | A | 6/2014 | |
| DE | 102016125077 | A1 * | 6/2017 | H04R 19/02 |
| EP | 2043386 | A2 | 4/2009 | |
| EP | 2312868 | A2 | 4/2011 | |
| EP | 2710731 | A1 | 3/2014 | |
| GB | 228176 | A | 7/1926 | |
| GB | 863659 | A | 3/1961 | |
| GB | 2413027 | A | 10/2005 | |
| GB | 2490931 | A | 11/2012 | |
| JP | S6046196 | A | 3/1985 | |
| JP | S60157399 | A | 8/1985 | |
| JP | 2002526004 | A | 8/2002 | |
| JP | 2007067483 | A | 3/2007 | |
| JP | 2007-184900 | A | 7/2007 | |
| JP | 2008022501 | A | 1/2008 | |
| JP | 2008085507 | A | 4/2008 | |
| JP | 2008172696 | A | 7/2008 | |
| JP | 2009038637 | A | 2/2009 | |
| JP | 2009100438 | A | 5/2009 | |
| JP | 2009153056 | A | 7/2009 | |
| JP | 2009284397 | A | 12/2009 | |
| JP | 2009296125 | A | 12/2009 | |
| JP | 2012028900 | A | 2/2012 | |
| JP | 5075836 | B2 | 11/2012 | |
| JP | 2013058889 | A | 3/2013 | |
| JP | 2016-521056 | A | 7/2016 | |
| JP | 2017-506461 | A | 3/2017 | |
| JP | 2017050709 | A | 3/2017 | |
| WO | 9301691 | A1 | 1/1993 | |
| WO | 9603806 | A1 | 2/1996 | |
| WO | 9835529 | A2 | 8/1998 | |
| WO | 0035246 | A1 | 6/2000 | |
| WO | 0173861 | A1 | 10/2001 | |
| WO | 0219764 | A1 | 3/2002 | |
| WO | 2007077438 | A1 | 7/2007 | |
| WO | 2012156753 | A1 | 11/2012 | |
| WO | 2012156754 | A1 | 11/2012 | |
| WO | 2015121638 | A1 | 8/2015 | |
| WO | 2015121641 | A1 | 8/2015 | |

OTHER PUBLICATIONS

"Sound from Ultrasound", Wikipedia, Feb. 12, 2016.

International Search Report regarding International Application No. PCT/GB2020/051134 completed on Jul. 8, 2020.

European Office Action regarding Patent Application No. 20726923.4, dated Sep. 15, 2023.

Wikipedia: "Sound from ultrasound—Wikipedia", Feb. 12, 2016 (Feb. 12, 2016), XP055712629, Retrieved from the Internet: URL:https://en.wikipedia.org/wiki/Sound_from_ultrasound [retrieved on Jul. 8, 2020].

* cited by examiner

ELECTROSTATIC TRANSDUCER AND DIAPHRAGM

CROSS-REFERENCE TO RELATED APPLICATIONS

This application is a Continuation of 371 U.S. National Phase application Ser. No. 17/595,011, filed on Nov. 5, 2021, which claims priority to International Application No. PCT/GB2020/051134, filed on May 7, 2020, which claims priority to U.K. Patent Application 1906425.2, filed on May 7, 2019. The entire disclosure of the above applications are incorporated herein by reference.

This invention relates generally to electrostatic transducers and diaphragms for electrostatic transducers and specifically to such electrostatic transducers and diaphragms for automotive applications, e.g. electrostatic transducers for use in motor vehicles.

A traditional electrostatic loudspeaker comprises a conductive diaphragm disposed between two perforated conductive stators to form a capacitor. A DC bias is applied to the diaphragm and an AC drive signal voltage is applied to the two stators. Voltages of hundreds or even thousands of volts may be required. The signals cause an electrostatic force to be exerted on the diaphragm, which moves to drive the air on either side of it. In a variation on such transducers, a single-ended arrangement may be used. Such configurations may comprise a single stator and a diaphragm, wherein a DC bias voltage and an AC drive voltage are both applied to the diaphragm to drive the diaphragm's movement.

Other transducers that operate on slightly different principles may employ a similar diaphragm, e.g. planar electrodynamic transducers, which operate based on magnetic fields, and electret transducers, in which the diaphragm is manufactured with a permanent electric charge, i.e. having a static electric field.

All of the above-mentioned types of transducer usually require a conductive surface on the diaphragm film, although the specific requirements vary depending on the type of transducer. Of those mentioned, the electrostatic types can be the most challenging for diaphragm design, mainly as a consequence of the very high voltages that are usually applied to the diaphragm in order to establish an electrical charge (e.g. hundreds or thousands of volts). Due to the high voltages, as the diaphragm moves towards the stators in normal operation, there is a risk of arcing or corona discharge, which can damage the diaphragm. Certain conditions, for example high humidity, may increase this risk significantly. Even when not moving, diaphragms may exhibit enough leakage current to reduce the charge voltage and alter the performance characteristics of the transducer. High excursions, i.e. where the diaphragm is deflected by a sufficiently large distance to closely approach the stators, may exacerbate the problem further.

Existing solutions to mitigate the likelihood of arcing, corona discharge and excessive leakage current have been limited to either employing a large spacing between the diaphragm and the stators or applying a specialised, high voltage electrically-insulating coating to the conductive surfaces (either of the diaphragm or of the stators).

However, these solutions introduce further problems. As the stator-to-diaphragm spacing increases the electrical field intensity is lowered, which lowers transducer sensitivity and/or the transducer maximum output (e.g. as quantified in terms of sound pressure level (SPL)). If an insulating coating is applied to the diaphragm, this will increase the mass of the diaphragm, lowering the SPL output and reducing the high frequency extension of the transducer's frequency range. Where an insulating coating is applied to the stator conductive surface, this can increase the acoustic impedance of the stator by reducing the size of the stator holes and consequently reducing the open area available for the air to pass through. This can reduce output levels and affect audio fidelity. In addition, the application of high voltage insulating coatings is generally technically very difficult and expensive and typically results in a non-uniform coating, making high volume production impracticable.

As a result of the challenges associated with insulating coatings, most electrostatic transducers rely on increased spacing of the diaphragm from the stators and do not have insulating coatings on the diaphragm or stator conductive surfaces. As a consequence, such electrostatic transducers suffer from lower output (SPL) and are prone to performance changes, reliability issues and premature failure, especially over long periods of extensive usage and with variations in temperature and humidity during use.

In addition to the challenges mentioned above, conventional electrostatic transducers have limitations that render them unsuitable for certain applications. In particular, electrostatic transducers are unsuitable for automotive applications, e.g. being used or installed in motor vehicles, as they are not sufficiently robust to withstand the environmental conditions to which the transducer would be subjected in the motor vehicle, e.g. during normal use of the motor vehicle or while the motor vehicle is parked and not in use. For example, motor vehicles are typically, or at least on some occasions, left parked in an outside environment when they are not in use. They are therefore exposed to the particular conditions (e.g. weather/seasonal/climate conditions) of that environment. This may include extreme high temperatures (e.g. if parked in direct sunlight in a hot climate in summer) or extreme low temperatures (e.g. if parked overnight in a cold climate in winter). As a further example, motor vehicle users may drive with the vehicle interior open to the outside environment via, for example, an open window, an open sunroof or a retracted roof. At typical speeds of travel for motor vehicles, this may result in buffeting, i.e. pressure waves of air impinging on the transducer. A transducer may also be subjected to air pressure waves resulting from a door on the vehicle being slammed shut. For a transducer to be suitable for use in automotive applications, it must be able to withstand these and other harsh conditions. Electrostatic transducers are, at present, insufficiently robust to meet these stringent requirements. Consequently, the benefits of electrostatic transducers are unavailable in automotive applications.

There is thus a need for an improved electrostatic transducer with better performance and greater reliability and specifically a need for an improved transducer suitable for use in automotive applications, e.g. for installation in a motor vehicle.

When viewed from a first aspect the invention provides a method of manufacturing an electrostatic transducer preferably for use in a motor vehicle, the method comprising manufacturing a composite laminated diaphragm and assembling the electrostatic transducer;

- wherein manufacturing the composite laminated diaphragm comprises:
  - providing a first insulating layer, wherein the first insulating layer comprises a sheet of uncharged insulating material;
  - providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein the thickness of the composite laminated diaphragm is less than 20 μm; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

The invention extends to an electrostatic transducer preferably for use in a motor vehicle, the electrostatic transducer comprising:

a first conductive stator;

a composite laminated diaphragm; and a first insulating spacer disposed between the first conductive stator and the diaphragm to provide a spacing of less than 1 mm between the first conductive stator and the diaphragm;

wherein the composite laminated diaphragm comprises:

a first insulating layer formed from a sheet of uncharged insulating material;

a conductive layer on a surface of the first insulating layer;

a second insulating layer extending over and bonded to the conductive layer, wherein the second insulating layer is formed from a sheet of uncharged insulating material;

wherein the thickness of the composite laminated diaphragm is less than 20 μm.

The invention may thus provide an electrostatic transducer that can generate a high electrical field intensity between the diaphragm and the stators due to the small spacing of less than 1 mm between the stator and the diaphragm. The invention may thus provide improved transducer sensitivity and/or maximum output (SPL) compared with transducers of the prior art having a large spacing and thus a lower electrical field intensity.

It will be appreciated from the teaching of the present application that the possibility of a spacing of less than 1 mm is opened up by the use of a diaphragm having the characteristics defined above. Specifically, in accordance with the invention, a second insulating layer is provided over the conductive layer of the diaphragm using a sheet of uncharged insulating material. This is in contrast with transducer diaphragms of the prior art, which typically use a single insulated layer with a metallised layer deposited thereon, optionally with an insulating coating deposited on the metallised layer. The Applicant has appreciated that providing a second insulating layer formed from a sheet of uncharged insulating material rather than a deposited coating allows an insulating layer to be provided over the conductive layer (i.e. insulating the conductive layer from the adjacent stator) without introducing the disadvantages of the prior art as discussed above.

It is therefore to be understood that a distinction is drawn herein between an insulating layer formed from a self-supporting sheet of material (e.g. that is formed as a separate laminar piece that is overlaid on and bonded to the conductive layer) compared with a coating (e.g. which is deposited on or applied to the conductive layer as a liquid, gel or vapour so as to build up a layer on the conductive surface as the coating substance is deposited).

The Applicant has appreciated that using a sheet of material allows the second insulating layer to be extremely uniform, allowing the possibility for the layer to be very thin. In contrast, coatings generally have poor uniformity, especially if only a thin layer is deposited, precluding the possibility of a thin coating in practice. A thin layer is advantageous because it allows the conductive layer to be covered with an insulating layer without significantly increasing the mass of the diaphragm. It is undesirable to increase the mass of the diaphragm because, as noted above, this can lower SPL output and reduce high frequency extension of the transducer. The areal weight of the diaphragm may be less than 50 $g/m^2$, preferably less than 30 $g/m^2$, more preferably less than 20 $g/m^2$, e.g. less than 10 $g/m^2$.

A thin insulating layer is also advantageous as it allows the overall thickness of the diaphragm to be low (i.e. less than 20 μm), which may advantageously provide the diaphragm with a desirable acoustic response (e.g. linear acoustic performance at frequencies above 15 kHz, e.g. including frequencies above 50 kHz). The diaphragm may have a thickness of less than 15 μm, or less than 10 μm. This may enhance the acoustic performance and/or frequency response further. The electrostatic transducer may, for example, have an output frequency range of 10 Hz to 65 kHz.

In addition, a second insulating layer formed from a sheet of insulating material allows a diaphragm with high flexibility to be manufactured. The mechanical compliance of such diaphragms may be similar to conventional thin film diaphragms that consist of an insulating layer with a metallised deposited layer, which may advantageously allow for a low fundamental resonance of the diaphragm.

The provision of the second insulating layer may also advantageously reduce the risk of arcing and corona discharge, and may also mitigate any current leakage that may otherwise diminish the performance of the transducer. For example, the first and second insulating layers may fully encapsulate the conductive layer.

Thus in accordance with the invention, a low mass, low thickness, high compliance diaphragm may be provided, providing an improved acoustic performance and frequency response (e.g. frequency range and output SPL) while also having an insulating layer to mitigate the risk of arcing, corona discharge and current leakage, thus allowing small spacings between the stators and the diaphragm and providing the associated improvement in output levels and audio fidelity.

Such diaphragms are novel and inventive in their own right, and thus when viewed from a second aspect, the invention provides a method of manufacturing a composite laminated diaphragm for an electrostatic transducer that is preferably suitable for use in a motor vehicle, the method comprising:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein the thickness of the composite laminated diaphragm is less than 20 μm.

This aspect of the invention extends to a composite laminated diaphragm for an electrostatic transducer that is preferably suitable for use in a motor vehicle, e.g. according to the first aspect of the invention, the composite laminated diaphragm comprising:

a first insulating layer formed from a sheet of uncharged insulating material;

a conductive layer on a surface of the first insulating layer;

a second insulating layer extending over and bonded to the conductive layer, wherein the second insulating layer is formed from a sheet of uncharged insulating material;

wherein the thickness of the composite laminated diaphragm is less than 20 μm.

When it is said that the first and second insulating layers are made from a sheet of insulating material that is uncharged, it is to be understood that this means the sheet is not provided with a permanent charge (e.g. producing a permanent external electric field) such as stable uncompensated surface charge or a permanent dipole moment in a dielectric material.

It is also to be understood that when it is said that the conductive layer is on a surface of the first insulating layer, this means that the conductive layer is deposited on or otherwise applied to the surface of the first insulating layer such that it is joined thereto.

The electrostatic transducer may have a single-ended configuration, e.g. the electrostatic transducer may comprise a single stator with a single spacer and the composite laminated diaphragm. In such arrangements, the electrostatic transducer may be configured to apply only an attractive electrostatic force between the stator and the diaphragm, in contrast with so-called "push-pull" configurations.

For example, a signal comprising a high voltage DC bias and an additional varying drive signal voltage may be applied to the diaphragm to cause the diaphragm to move to produce the desired acoustic output.

However, the invention is not limited to this possibility, and in a set of embodiments, the method further comprises:

providing a second conductive stator and a second insulating spacer;

securing the second conductive stator and the second insulating spacer in the stack with the second insulating spacer between the second conductive stator and the diaphragm to provide a spacing of less than 1 mm between the second conductive stator and the diaphragm.

Similarly, in a set of embodiments the electrostatic transducer comprises:

a second conductive stator;

a second insulating spacer disposed between the second conductive stator and the diaphragm to provide a spacing of less than 1 mm between the second conductive stator and the diaphragm.

The electrostatic transducer of such embodiments may be referred to as a five-layer transducer, or a "push-pull" transducer, i.e. wherein the transducer may be configured such that the diaphragm is simultaneously pulled towards one stator and pushed away from the other stator by a varying drive signal applied to the stators. For example, a high voltage DC bias may be applied to the diaphragm, while a varying voltage corresponding to the desired audio signal is applied to the stators (the signal applied to one stator being inverted with respect to the signal applied to the other stator).

In a set of embodiments, the second insulating layer is bonded to the conductive layer by applying an adhesive layer to the conductive layer and overlaying the second insulating layer on the adhesive layer or applying an adhesive layer to the second insulating layer and overlaying the second insulating layer on the conductive layer. However, this is not essential, and the second insulating layer may be bonded to the conductive layer in other ways, e.g. using ultrasonic welding.

The adhesive may be a sheet (as distinct from a coating as discussed above), e.g. a thin film sheet, overlaid on the conductive layer. Alternatively, the adhesive may be applied as a coating, e.g. as a liquid or gel. The adhesive layer may be self-curing, pressure-cured, UV-cured, heat-cured, chemical-cured, or cured or set in another way. The adhesive type, thickness and composition may vary depending on the specific application of the electrostatic transducer.

In a set of preferred embodiments, the adhesive layer comprises an acrylic-based adhesive. However, this is not essential, and other adhesives may be selected to provide the properties identified by the Applicant as being advantageous. For example, the adhesive may be selected to be compliant, i.e. such that it does not harden upon setting/curing to make the diaphragm more rigid. The adhesive may be selected so that the diaphragm is air- and moisture-tight once the diaphragm has been manufactured, e.g. by laminating and compressing the layers, i.e. so the adhesive prevents air or liquid from permeating or migrating through the film. The adhesive may be selected such that it can be cured or set without changing its properties significantly afterwards.

In embodiments where the adhesive layer is not provided as a sheet of material, (for example in embodiments where the adhesive layer is applied as a coating, e.g. sprayed on in liquid form), the adhesive may be selected such that the adhesive layer has uniform coverage once applied. The adhesive may be selected (e.g. in conjunction with the selection of the adhesive layer thickness as discussed below) to provide internal damping of the diaphragm to dampen resonance behaviour, e.g. especially at lower frequencies.

As non-limiting examples, suitable adhesives that may be used include two-part adhesives (e.g. thermoset polymers) which use a resin and a hardener; epoxies, acrylates, and polyurethanes (which may use a solvent); hot melt adhesives; PVA (polyvinyl acetate), EVA (ethylene-vinyl acetate), and polyurethane thermoplastics (which may be applied in the form of a sheet); and pressure-sensitive adhesives. However, other suitable adhesives known to the skilled person and having the desired properties discussed above may be used in embodiments of the invention.

The adhesive may be selected such that this does not produce any gas, e.g. any volatile organic compound (VOC), as part of the curing reaction. This avoids the formation of any bubbles in the final film which can affect the performance of the diaphragm. The adhesive should be selected to have a suitable bond strength, e.g. to provide a bond strength sufficient to enable the layers of the film to remain adhered to each other when subjected to the conditions present in automotive applications as discussed above (e.g. when subjected to a temperature range of from −40° C. to +120° C.). Suitable for use in this respect are the epoxy-based adhesives. However, other adhesives which do not give rise to any "off-gassing" and which have a high bond strength that would be suitable are also known and may be used.

In a set of embodiments, the adhesive layer has a thickness of 1 μm to 10 μm, preferably 3 μm to 5 μm, more preferably 3 μm to 4 μm. The Applicant has appreciated that the internal damping properties of the diaphragm can be enhanced using the adhesive layer by choosing a suitable thickness. The Applicant has found that a thickness in the range 3 μm to 5 μm is particularly advantageous for many applications to allow damping of resonant behaviour.

The conductive layer may distribute and retain electrical charge (e.g. from a DC bias voltage) and/or the conductive layer may conduct a drive signal (e.g. an AC voltage). The thickness of the conductive layer may be selected to provide a balance between providing sufficient thickness for manufacturability and durability, as well as sufficient conductivity for the specific application, and avoiding excessive thickness that may unnecessarily add to the mass of the diaphragm (affecting its acoustic performance) and/or that may unnecessarily use more material than required in manufacturing the diaphragm. In a set of embodiments, the conductive layer has a thickness that is less than 1% of a thickness of the composite laminated diaphragm, preferably less than 0.5%, more preferably less than 0.1%. The conductive layer may have a thickness of 5 nm to 50 nm, preferably 8 nm to 30 nm, although the thickness may be outside of these ranges, e.g. less than 5 nm, e.g. 1 nm to 2 nm.

The conductivity of the conductive layer that is required may depend on the specific application, e.g. the configuration of the transducer in which the diaphragm is used.

For example, in embodiments in which a varying voltage is applied to the diaphragm, e.g. the single-ended configuration discussed above, the conductivity may need to be higher than in embodiments in which only a DC voltage biased is applied to the diaphragm, e.g. push/pull configurations. In the former case, the conductive layer needs to conduct a varying signal and so a thicker conductive layer and/or a more conductive material may be used for the conductive layer. For example, 30 nm of aluminium may be used. In the latter case, the conductive layer only needs to hold a static charge, and so a thinner conductive layer and/or a less conductive material may be used, e.g. 8 nm of gold may be used for the conductive layer.

The conductive layer may be conductive by virtue of comprising a conducting material. The conducting material may be a metal, e.g. gold or aluminium. The conductive layer may be, for example, a metallisation layer, e.g. deposited on the first insulating layer by vapour deposition. However, conducting non-metals, e.g. graphite or other forms of carbon, may be used. The conductive layer may be conductive by virtue of comprising a semi-conducting material.

The conductive layer may be uniform, or it may be masked with a specific pattern, such as a signal trace path or coil. The conductive layer may be applied to the first insulating layer by means of any suitable technique, such as vapour deposition, sputtering or photo-chemical masking.

In a set of embodiments, the first insulating layer has a thickness of 5 μm to 15 μm, preferably 6 μm to 8 μm, more preferably about 7 μm. In a set of embodiments, the second insulating layer has a thickness of 5 μm to 15 μm, preferably 6 μm to 8 μm, more preferably about 7 μm. The thickness of the first and second insulating layers may thus be selected to meet the requirement that the composite laminated diaphragm is less than 20 μm thick, while providing the desired low mass and high compliance properties that provide the desired linear acoustic performance as discussed above.

In a set of embodiments, the composite laminated diaphragm has a length and/or a width that is greater than 1 cm, preferably greater than 5 cm. The composite laminated diaphragm in accordance with the present invention may therefore be considered a "thin film" diaphragm, that is, the diaphragm may be thin when the overall length scale of the diaphragm and the electrostatic transducer is taken into consideration. This is to be understood as being distinct from miniature systems, e.g. microelectro-mechanical systems (MEMS), in which the entire diaphragm and transducer may be provided having a small length scale, e.g. transducers and diaphragms having a length/width of micrometres or a few millimetres.

In a set of embodiments, the first insulating layer and/or the second insulating layer is formed from a polymer material. The Applicant has found that such materials may be advantageous in reducing arcing and corona discharge, as well as reducing leakage current. The first insulating layer and/or the second insulating layer may be formed from a material with a dielectric breakdown strength greater than 500 V/μm, preferably greater than 550 V/μm. The first insulating layer and/or the second insulating layer may be formed from a material with a dielectric breakdown strength in the range 300 V/μm to 600 V/μm. The Applicant has found that selecting a material, e.g. a polymer material, having this property is particularly advantageous in reducing the risk of arcing and corona discharge. However, materials with a lower dielectric breakdown strength may be used, for example, by providing the layer with a greater thickness (e.g. compared with an equivalent layer made from a material having a higher dielectric breakdown strength). The dielectric breakdown strength may be greater than 150 V/μm, or greater than 200 V/μm. It is not essential for the first and/or second insulating layer to be made from a polymer material. For example, a ceramic material, e.g. alkali-free glass, may be used. It is to be understood that where values or ranges for the dielectric breakdown strength are given, these may be applicable under the conditions of use in automotive applications, preferably across all temperatures in the range −40° C. to +120° C. The dielectric breakdown strength may be measured according to standard test ASTM D149 or IEC 60243-1.

The first insulating layer and/or the second insulating layer may be formed from a material with a dielectric constant less than 2.5, preferably less than 2.3. The Applicant has found that selecting a material, e.g. a polymer material having these properties may be particularly advantageous in reducing leakage current.

In a set of embodiments, the first insulating layer and/or the second insulating layer is/are formed from a capacitor film, e.g. a dielectric film suitable for use in a capacitor.

In a set of embodiments, the first insulating layer and/or the second insulating layer has/have a compliance equal to the compliance of a layer having a thickness of up to 20 nm and being formed from biaxially-oriented polypropylene (BOPP), polyaryletheretherketone (PEEK™), or polytetrafluoroethylene (PTFE, e.g. TEFLON™).

In a set of embodiments, the first insulating layer and/or the second insulating layer is formed from a material selected from the group consisting of:

biaxially-oriented polypropylene (BOPP);
polyaryletheretherketone (PEEK™);
polytetrafluoroethylene (PTFE, e.g. TEFLON™);
biaxially-oriented polyethylene terephthalate (BOPET);
polyphenylene sulfide (PPS);
polyetherimide (PEI);
polyethylene-naphthalate (PEN);
polyimide (PI);
polyethylene terephthalate (PET);

polycarbonates (PC);
polyethersulphone (PESU);
polyphenylsulphone (PPSU);
polysulphone (PSU);
ethylene tetrafluoroethylene (ETFE);
perfluoroalkoxy (PFA);
polyvinylidene fluoride (PVDF);
poly(vinylidene fluoride-trifluoroethylene) copolymers (PVDF-TrFE); and
poly(vinylidene fluoride-trifluoroethylene) copolymers incorporating chlorotrifluoroethylene (PVDF-TrFE-CFE).

However, other material besides those listed above may be used, and it is within the skilled person's expertise, having the benefits of the teaching of the present application, to select other materials having the above-mentioned dielectric breakdown strength and dielectric constant properties which may also be used in accordance with the present invention.

The transducer is preferably a loudspeaker, but this is not essential. In some embodiments, the transducer is a microphone.

As noted above, the electrostatic transducer is preferably suitable for use in a motor vehicle. In this context, it is to be understood that "in" is not limited to meaning inside (e.g. in an interior of) the motor vehicle, but includes being suitable for use inside or on a motor vehicle. For example, it may be used inside or on a road vehicle such as a car, a lorry, a bus, a motor cycle or a coach. It finds particular use in a car.

The invention extends to the use of an electrostatic transducer as herein described in a motor vehicle.

The electrostatic transducer may be suitable for installation in a motor vehicle. For example, the electrostatic transducer may be shaped for installation in a motor vehicle, e.g. it may be shaped to conform to a part of an interior of a motor vehicle. The electrostatic transducer may comprise a housing that is shaped for installation in a motor vehicle, e.g. the housing may be shaped to conform to a part of an interior of a motor vehicle.

The method may comprise installing the electrostatic transducer in a motor vehicle.

The invention extends to a motor vehicle comprising an electrostatic transducer as herein described.

As discussed above, a transducer in a motor vehicle may be subjected to harsh conditions (e.g. during use of the motor vehicle or while the vehicle is parked and not in use), such as extreme temperatures (e.g. ranging from −40° C. to +120° C.), including rapid changes in temperature, and buffeting by air pressure waves due to, for example, open windows and door slam. Other examples include the presence of moisture, salt spray, dust, and/or chemicals such as fuels, oils and cleaners; vibrations; and mechanical, thermal and acoustic shocks. Electrostatic transducers of the prior art are unable to withstand these conditions. For example, high temperatures may result in breakdown of the insulation in the transducer, leading to dielectric breakdown.

Furthermore, not only is it necessary for a transducer for use in a motor vehicle to maintain structural and functional integrity in the presence of such conditions, but robustness must be achieved while also meeting performance requirements (e.g. specified acoustic performance requirements) that in some cases provide competing objectives. For example, it is possible to manufacture a diaphragm that is more robust by manufacturing the diaphragm with a greater thickness or from certain materials that provide greater robustness. However, increasing the diaphragm thickness lowers the SPL output and reduces the high frequency extension of the transducer's frequency range, thus diminishing performance. In addition, materials that provide increased robustness typically also have greater stiffness, which is detrimental to the low frequency performance of the diaphragm.

Other considerations for meeting performance requirements may include maintaining charge confinement, providing a diaphragm with high compliance, and achieving a broad frequency range.

The Applicant has appreciated that certain materials, in particular certain combinations of materials, when used to manufacture a composite laminated diaphragm for an electrostatic transducer in accordance with the invention, can advantageously yield a diaphragm and electrostatic transducer that are not only sufficiently robust to withstand the challenging environmental conditions present in automotive applications, but also meet high performance requirements, e.g. in terms of SPL, frequency response and low distortion levels.

It is to be appreciated that while desired properties of a manufactured diaphragm may be readily determined or defined based on, for example, measured environmental conditions and chosen or stipulated performance requirements, it may not be straightforward to determine which specific materials and material characteristics (and, in particular, which combinations thereof) will necessarily yield those desired properties when they are used to manufacture a composite diaphragm. As noted above, for automotive applications, multiple robustness criteria as well as performance criteria may be defined, where the criteria are not necessarily independent of each other, and where the diaphragm must ideally meet all of those criteria. It may therefore not be straightforward to identify materials and material properties (or combinations thereof) which will simultaneously meet all of those criteria.

The composite laminated diaphragm may be manufactured from a composite material or film as described below, wherein the composite material or film comprises the first and second insulating layers and the conductive layer. References to layers (or constituent layers) of the composite material or film are to be understood to mean one or more (e.g. all) layers from which the composite material or film (and thus the composite laminated diaphragm) is formed, e.g. the first and/or second insulating layer(s) and/or the conductive layer and/or the adhesive layer.

For use in the manufacture of a diaphragm to be used in automotive applications, the Applicant has identified certain key criteria for the composite materials herein described. These include, but are not limited to, the glass transition temperature (Tg), the Coefficient of Thermal Expansion (CTE) (in both the machine and transverse/cross-sectional directions), and the Surface Energy (e.g. the Polar Surface Energy) of the composite material or film. The Surface Energy (e.g. the Polar Surface Energy) may determine at least in part the bond strength between the layers (and other related properties e.g. the inter-laminate shear strength). The key criteria may also include the degree of matching of certain parameters between constituent layers of the composite material or film and/or between the composite material or film and other components in the transducer (e.g. the spacer(s) and/or the stator(s)). The key criteria may also include the isotropy of the composite material or film.

The Applicant has identified that one problem with existing composite materials for use in the manufacture of a diaphragm is the lack of uniformity in their mechanical and/or other performance characteristics when measured in the machine and transverse directions, i.e. such prior art materials tend to be non-isotropic when measured in these two directions. This is a particular problem when the diaphragm is intended to be used in an automotive application.

In one set of embodiments, the composite material or film for use in the manufacture of the diaphragm according to the invention are substantially isotropic as produced and retain this property under the conditions of use, in particular when subjected to any of the environmental conditions herein described such as temperature and/or pressure. By "isotropic" it is meant that the material has substantially the same properties in all directions. Substantially the same, as used in this context, means that the difference in the properties of the material in different directions is 50% or less, preferably 20% or less, more preferably 10% or less, more preferably 5% or less, and more preferably 1% or less. In one embodiment, the properties of the materials in all directions are "matched" as herein described.

For example, in one set of embodiments, the Young's Modulus of the composite material is substantially the same when measured in the machine and transverse directions. Alternatively, or in addition, the CTE of the composite material, when measured in the machine and transverse directions, is substantially the same. Alternatively, or in addition, the yield strength and/or the tensile strength of the composite material, when measured in the machine and transverse directions, is substantially the same. As used in this context, "substantially the same" is intended to mean that the values of the measured property do not differ by more than 50%, preferably by not more than 20%, more preferably by not more than 10%, more preferably by not more than 5%, e.g. by not more than 1%. As will be understood, such properties should be substantially the same not only in respect of the "as produced" composite material, but importantly also under its intended conditions of use.

In one set of embodiments, the Young's moduli of the composite material and/or of the constituent layers measured in the machine and transverse directions have a ratio Emin/Emax which is greater than 0.7, preferably greater than 0.8, e.g. greater than 0.9, where Emin is the lower of the Young's modulus values in the machine and transverse directions and Emax is the higher of the Young's modulus values in the machine and transverse directions.

In one set of embodiments, the yield strengths of the composite material and/or of the constituent layers measured in the machine and transverse directions have a ratio σmin/σmax which is greater than 0.7, preferably greater than 0.8, e.g. greater than 0.9, where σmin is the lower of the yield strength values in the machine and transverse directions and σmax is the higher of the yield strength values in the machine and transverse directions.

In one set of embodiments, the Coefficients of Thermal Expansion of the composite material and/or of the constituent materials measured in the machine and transverse directions have a ratio CTEmin/CTEmax which is greater than 0.5, preferably greater than 0.7, e.g. greater than 0.9, where CTEmin is the lower of the CTE values in the machine and transverse directions and CTEmax is the higher of the CTE values in the machine and transverse directions.

In a set of embodiments, the composite material or film for use as the diaphragm in accordance with the invention has at least one parameter for which respective measured values thereof are matched between two or more layers (e.g. at least the first and second insulating layers) of the composite material or film, wherein the at least one parameter is preferably selected from the group consisting of a Coefficient of Thermal Expansion, a Young's modulus, a yield strength and a tensile strength.

In a set of embodiments, the composite material or film for use as the diaphragm in accordance with the invention has the following properties:

i) a glass transition temperature of at least 120° C.;

ii) at least one parameter for which respective measured values thereof are matched between two or more layers (e.g. at least the first and second insulating layers) of the composite material or film, wherein the at least one parameter is preferably selected from the group consisting of a Coefficient of Thermal Expansion, a Young's modulus, a yield strength, and tensile strength; and iii) a Surface Energy in the range of from 30 to 60 dynes/cm and/or a Polar Surface Energy greater than 12 dynes/cm.

Preferably the parameter(s) have respective measured values that are matched between all layers in the composite material or film. Preferably the parameter(s) have respective measured values that are matched between some or all layers both in the case that the parameter(s) is/are measured in the machine direction and in the case that the parameter(s) is/are measured in the transverse direction. In this context, "matched" may mean that the parameter values are close enough to each other that any expansion and/or contraction of the composite material or film or of its constituent layers due to exposure to high or low temperatures does not cause the composite material or film or any of its constituent layers to expand or contract past its yield point. High temperatures and low temperatures in this context may refer to extreme temperatures to which the transducer is exposed during use in automotive applications (e.g. temperatures up to +120° C. and/or down to −40° C.). In this context, "matched" may mean "substantially the same" within the meaning defined hereinabove. For example, "matched" may mean that the parameter values do not differ by more than 10%, preferably by not more than 5%, e.g. by not more than 1%.

The glass transition temperature (Tg) of the composite material and/or of the constituent layers may be at least 120° C., e.g. at least 140° C., preferably in the range from 120° C. to 260° C., more preferably from 140° C. to 220° C. The composite film and/or the constituent layers may have a continuous use temperature of at least 150° C.

The glass transition temperature may be measured according to standard test ASTM D3418. The continuous use temperature may be measured according to standard test ISO 11357.

The CTE of the composite material should be such that it does not expand or contract beyond its yield point both "as manufactured" and under the intended conditions of use, for example when exposed to typical conditions during use in automotive applications, e.g. temperatures up to +120° C. and/or down to −40° C.

In respect of the composite material and/or the constituent layers, the Young's modulus, when measured in the machine direction (MD) may, for example, be in the range from 2 GPa to 8 GPa, preferably from 2 GPa to 3 GPa. When measured in the transverse (or cross-sectional direction, CD), the Young's modulus may, for example, be in the range from 2 GPa to 8 GPa, preferably from 2 GPa to 3 GPa. The average of the Young's modulus of the composite material measured in the machine and transverse directions may be in the range from 2 GPa to 8 GPa, preferably from 2 GPa to 3 GPa.

In respect of the composite material and/or the constituent layers, the yield strength, when measured in the machine direction (MD) may, for example, be greater than 80 MPa, preferably greater than 100 MPa, e.g. at least 120 MPa.

When measured in the transverse (or cross-sectional direction, CD), the yield strength may, for example, be greater than 80 MPa, preferably greater than 100 MPa, e.g. at least 120 MPa. The lower of the yield strength of the composite material when measured in the machine direction and the yield strength of the composite material when measured in the transverse direction may be greater than 80 MPa, preferably greater than 100 MPa, e.g. at least 120 MPa. It is to be understood that where values or ranges for the Young's Modulus are given, these may be applicable under the conditions of use in automotive applications, preferably across all temperatures in the range −40° C. to +120° C. The Young's modulus and/or the yield strength may be measured according to standard test ISO 527 or ASTM D638.

In respect of the composite material and/or the constituent layers, the Coefficient of Thermal Expansion, when measured in the machine direction (MD) may, for example, be less than $80\times10^{-5}$/° C., preferably less than $80\times10^{-6}$/° C. When measured in the transverse (or cross-sectional direction, CD), the Coefficient of Thermal Expansion may, for example, be less than $80\times10^{-5}$/° C., preferably less than $80\times10^{-6}$/° C. It is to be understood that where values or ranges for the Coefficient of Thermal Expansion are given, these may be applicable under the conditions of use in automotive applications, preferably across all temperatures in the range −40° C. to +120° C. The Coefficient of Thermal Expansion may be measured according to standard test ASTM E831, ASTM D696 or ISO 11359-2.

The Surface Energy of the composite material may, for example, be in the range from 35 to 55 dynes/cm, preferably from 35 to 45 dynes/cm. The Polar Surface Energy of the composite material may, for example, greater than 15 dynes/cm, e.g. greater than 20 dynes/cm. It is to be understood that where values or ranges for the Surface Energy and/or the Polar Surface Energy are given, these may be applicable under the conditions of use in automotive applications, preferably across all temperatures in the range −40° C. to +120° C. The Surface Energy and/or the Polar Surface Energy may be measured according to standard test ASTM-D7334-08.

The Surface Energy and/or the Polar Surface Energy may refer to values obtained prior to application of any processes or treatments, e.g. plasma treatments, flame treatments.

In a set of embodiments wherein the transducer comprises a diaphragm formed from a composite material or film in accordance with the description above, at least one parameter measured for the composite material or film has a value or values which match(es) a corresponding value or corresponding values of the same parameter(s) measured for at least one structural component of the transducer, e.g. at least one of the first stator, the first spacer, the second stator (where provided) and the second spacer (where provided). The at least one parameter may include one or more parameters selected from the group consisting of a Coefficient of Thermal Expansion, a Young's modulus, a yield strength and a tensile strength. Preferably the at least one parameter matches in both the machine direction of the composite material or film and in the transverse direction of the composite material or film. The at least one structural component may comprise the first stator and the first spacer. The at least one structural component may comprise the first and second stators and the first and second spacers. Additionally or alternatively, the diaphragm may be mounted in the transducer by an intervening material or structure having sufficient flexibility or compliance to allow the diaphragm and the transducer structural components (e.g. the spacer(s) and the stator(s)) to expand or contract by a differing amount without damage to the diaphragm (e.g. by flexing, compressing or expanding to compensate for the difference in expansion or contraction).

The Applicant has identified particular polymer materials which can be used to produce a composite material having the desired key criteria as herein defined.

The first insulating layer and/or the second insulating layer may be formed from a thermoplastic polymer having a glass transition temperature (Tg) of at least 120° C., preferably in the range from 120 to 260° C., e.g. in the range from 140 to 220° C.

In a set of embodiments, the first insulating layer and/or the second insulating layer is formed from a material having the properties herein defined, in particular the defined glass transition temperature, CTE, Surface Energy and Polar Surface Energy.

The Applicant has found that a polymer material selected from the group consisting of polyaryletheretherketones (PEEK), polyetherimides (PEI) and polyethylene-naphthalates (PEN) is particularly suitable for use in forming the first and/or second insulating layers. The first insulating layer and/or second insulating layer of the composite material may therefore comprise a polymer selected from a polyaryletheretherketone (PEEK), a polyetherimide (PEI) and a polyethylene-naphthalate (PEN). In one set of embodiments, one or both of the first and second insulating layers may consist essentially of such a polymer.

In a set of embodiments, the composite material for use as the diaphragm in accordance with the invention comprises:

- a first insulating layer formed from a sheet of insulating material which comprises a polyaryletheretherketone, a polyetherimide, or a polyethylene-naphthalate;
- a conductive layer on a surface of the first insulating layer; and
- a second insulating layer extending over and bonded to the conductive layer, wherein the second insulating layer is formed from a sheet of insulating material which comprises a polyaryletheretherketone, a polyetherimide, or a polyethylene-naphthalate.

The polymer materials used to form the first and second insulating layers of the composite material may be the same or different. In one set of embodiments, these will be selected from the same class of polymer. For example, these may both be PEEK polymers, both be PEI polymers, or both be PEN polymers. In another set of embodiments, the polymer materials which form the insulating layers will be identical.

In one set of embodiments, the first and second insulating layers are both formed from a material which comprises, or which consists essentially of, a polyaryletheretherketone (PEEK). Suitable PEEK polymers may readily be identified by the skilled person having in mind the key criteria described herein. Such polymers may include, but are not limited to, VICTREX® PEEK 381G, Sciengy® PEEK-GRN20G, and KetaSpire® KT850. Suitable film materials containing such polymers may include, but are not limited to, APTIV 1000, APTIV 1100, and APTIV 2000. Such products are available from Victrex PLC, Shanong Sciengy New Materials, and Solvay Specialty Polymers.

In one set of embodiments, the first and second insulating layers are both formed from a material which comprises, or which consists essentially of, a polyetherimide (PEI). Suitable PEI polymers may readily be identified by the skilled person having in mind the key criteria described herein. Such polymers may include, but are not limited to, ULTEM Resin 1000, ULTEM Resin 1010, ULTEM Resin 1100, and Duratron U1000. Suitable film materials containing such polymers include, but are not limited to, SABIC ULTEM UTF120, SABIC ULTEM 1000B, Norton Kemid Film and Tempalux Film. Such products are available from SABIC, Mitsubishi Advanced Chemicals, and Westlake Plastics Company Saint Gobain.

In one set of embodiments, the first and second insulating layers are both formed from a material which comprises, or which consists essentially of, a polyethylene-naphthalate (PEN). Suitable PEN polymers may readily be identified by the skilled person having in mind the key criteria described herein. Such polymers may include, but are not limited to, NOPLA® KE901. Suitable film materials containing such polymers include, but are not limited to, Teonex and Kaladex. Such products are available from KOLON Plastics Inc. and DuPont.

Although the Applicant has found that the diaphragm in accordance with the second aspect of the invention may be used to particular advantage in electrostatic transducers having a stator-to-diaphragm spacing of less than 1 mm, e.g. in electrostatic transducers in accordance with the first aspect of the invention, the diaphragm may also be advantageously used in other applications. The diaphragm may be used in electrostatic transducers that are as defined above in accordance with the first aspect of the invention, except with a spacing between the first stator and the diaphragm (and, where provided, the second stator and the diaphragm) that is not necessarily less than 1 mm. The diaphragm may also be used in planar electrodynamic transducers. A variation on the diaphragm of the second aspect may be used in electret transducers by manufacturing the diaphragm using sheets of insulating material that are charged instead of uncharged. When viewed from a third aspect therefore, the invention provides a method of manufacturing a composite laminated diaphragm for a transducer, the method comprising:

- providing a first insulating layer, wherein the first insulating layer comprises a sheet of insulating material;
- providing a conductive layer on a surface of the first insulating layer;
- providing a second insulating layer, wherein the second insulating layer comprises a sheet of insulating material;
- bonding the second insulating layer to the conductive layer such that the second insulating layer extends over the conductive layer;
- wherein the thickness of the composite laminated diaphragm is less than 20 μm.

This aspect of the invention extends to a composite laminated diaphragm for a transducer comprising:

- a first insulating layer formed from a sheet of insulating material;
- a conductive layer on a surface of the first insulating layer;
- a second insulating layer extending over and bonded to the conductive layer, wherein the second insulating layer is formed from a sheet of insulating material;
- wherein the thickness of the composite laminated diaphragm is less than 20 μm.

In embodiments in accordance with the third aspect, the first insulating layer and/or the second insulating layer may be formed from a sheet of charged insulating material. The sheet of charged insulating material may have a permanent charge, e.g. a stable uncompensated surface charge or a permanent dipole moment. The sheet of charged insulating material may be a dielectric material.

Any feature or combination of features (including any features relating to the transducer, the diaphragm, the composite material or film and/or the constituent layers of the composite diaphragm or film) of the first and second aspects may, where applicable, also be features of the third aspect of the invention.

Certain preferred embodiments will now be described, by way of example only, with reference to the accompanying drawings, in which.

Figure 1:
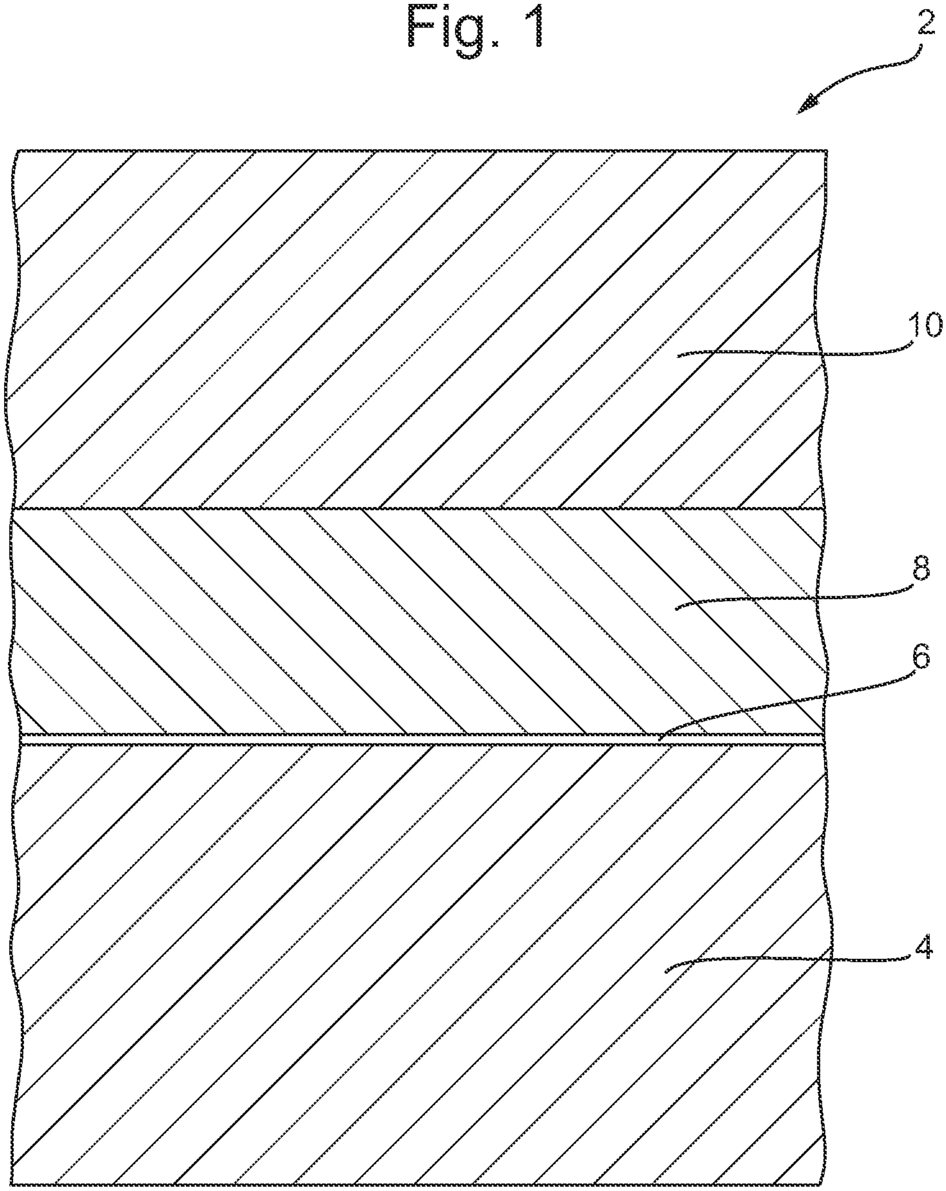
FIG. 1 shows a cross-section of a composite laminated diaphragm in accordance a first embodiment of the present invention.

FIG. 1 shows a cross-sectional view of a composite laminated diaphragm 2 in accordance with a first embodiment of a present invention. The diaphragm 2 comprises a first insulating layer 4 which serves as a substrate. The first insulating laying 4 is made from biaxially-oriented polypropylene (BOPP) and is 7 μm thick.

A conductive layer 6 is deposited on a surface of the first insulating layer 4. The conductive layer 6 is an 8 nm thick layer of gold. In this embodiment, the conductive layer 6 is deposited on the first insulating layer 4 using vapour deposition, although any other suitable method known to the skilled person may be used.

Overlaid on the conductive layer 6 is an adhesive layer 8. In this example, the adhesive layer is applied as a coating to the second insulating layer 10. The second insulating layer is then overlaid on the conductive layer 6 and pressure is applied to cause the layers to adhere together. However, any other suitable method known to the skilled person may be used, e.g. the adhesive layer 8 may be applied to the conductive layer 6 as a coating (e.g. in a liquid form by spraying) and then the second insulating layer 10 overlaid on the adhesive. The second insulating layer 10 is also 7 μm thick and made from biaxially oriented polypropylene (BOPP).

After the second insulating layer 10 has been overlaid on the adhesive, the adhesive is cured in order to set it. The layers may be pressed together during the curing process, depending (for example) on the specific adhesive used. In this example, the adhesive is a viscoelastic acrylic-based adhesive. The adhesive layer is 5 μm thick.

It will be appreciated that due to the difference in order of magnitude between the thickness of the gold conductive layer 6 and the insulating and adhesive layers 4, 8, the layer thicknesses in FIG. 1 are not shown to scale.

The electrical and mechanical properties of the layers 4, 6, 8, 10 are shown below in Tables 1 and 2. The properties shown include the Young's modulus, which affects the stiffness of the diaphragm, and thus its acoustic properties. The dissipation factor affects the diaphragm's energy dissipation, and thus the Q (quality) factor of its modes.

TABLE 1

| Layer | Material Name | Thickness | Volume Density (kg m$^{-3}$) | Young's Modulus |
|---|---|---|---|---|
| 4 | BOPP Film | 7 μm | 910 | 3.0 GPa (length), 5.3 GPa (width) |

TABLE 1-continued

| Layer | Material Name | Thickness | Volume Density (kg $m^{-3}$) | Young's Modulus |
|---|---|---|---|---|
| 6 | Acrylic Adhesive | 5 μm | 1050 | 600 MPa |
| 8 | Gold coating on BOPP Film | 8 nm | 19,400 | 78 GPa |
| 10 | BOPP Film | 7 μm | 910 | 3.0 GPa (length), 5.3 GPa (width) |

TABLE 2

| Layer | Dielectric Constant | Dielectric Breakdown Strength (V/μm) | Damping or dissipation factor |
|---|---|---|---|
| 4 | 2.2 | 550 | 0.0004 |
| 6 | 2 | — | 0.03 |
| 8 | 2.0 | — | 0.0003 |
| 10 | 2.2 | 550 | 0.0004 |

Tables 3 and 4 show the electrical and mechanical properties of some example materials that may be used for the first and/or second insulating layers. Table 3 shows example layer thickness ranges that may be used for each material.

TABLE 3

| Material Name | Thickness (μm) | Volume Density (kg $m^{-3}$) | Young's Modulus |
|---|---|---|---|
| BOPP | 3-18 | 910 | $E_1$ = 4.6 GPa<br>$E_2$ = 2.6 GPa |
| BOPET | 3-18 | 1395 | $E_1$ = 4.5 GPa<br>$E_2$ = 4.3 GPa |
| PPS | 12-25 | 1350 | $E_1$ = 4 GPa<br>$E_2$ = 3.8 GPa |
| PEI | 5-20 | 1270 | $E_1$ = 2.9 GPa<br>$E_2$ = 2.9 GPa |
| PEN | 5-20 | 1360 | $E_1$ = 6.1 GPa<br>$E_2$ = 6.1 GPa |
| PI | 7.5-25 | 1540 | $E_1$ = 3.2 GPa<br>$E_2$ = 3.2 GPa |
| PEEK | 6-25 | 1260 | $E_1$ = 2.6 GPa<br>$E_2$ = 2.8 GPa |

TABLE 4

| Material Name | Dielectric Constant | Dielectric Breakdown Strength (V/μm) | Damping or dissipation factor |
|---|---|---|---|
| BOPP | 2.2 | 600 | 0.0002 |
| BOPET | 3.3 | 330 | 0.0005 |
| PPS | 3 | 470 | 0.03 |
| PEI | 3.2 | 490 | 0.004 |
| PEN | 3 | 300 | 0.003 |
| PI | 3.9 | 280 | 0.003 |
| PEEK | 3.5 | 270 | 0.002 |

Table 5 shows the environmental properties of some materials which may be used for the first and/or second insulating layers.

TABLE 5

| Material Name | Glass Transition Temperature Tg (° C.) | Coefficient of Thermal Expansion CTE (°/C.) (2 directions) | Surface Energy (dynes/cm) | Continuous use temperature (° C.) |
|---|---|---|---|---|
| BOPP | 105 | 49 × $10^{-5}$ (MD)<br>62 × $10^{-5}$ (CD) | 29 | 85 |
| BOPET | 110 | 15 × $10^{-6}$ (MD)<br>11 × $10^{-6}$ (CD) | 42 | 105 |
| PPS | 140 | 40 × $10^{-6}$ (MD)<br>40 × $10^{-6}$ (CD) | 38 | 160 |
| PEI | 214 | 49 × $10^{-5}$ (MD)<br>62 × $10^{-5}$ (CD) | 40-45 | 185 |
| PEN | 150 | 13 × $10^{-6}$ (MD)<br>13 × $10^{-6}$ (CD) | 40 | 160 |
| PI | 216 | 20 × $10^{-6}$ (MD)<br>18 × $10^{-6}$ (CD) | 40-50 | 200 |
| PEEK | 143 | 60 × $10^{-6}$ (MD)<br>60 × $10^{-6}$ (CD) | 34-38 | 150 |

As discussed below with reference to FIG. 3, when the diaphragm is installed in a push-pull type electrostatic transducer, a DC bias voltage is applied to the conductive gold layer 6 and a varying drive signal voltage is applied to the stators of the electrostatic transducer to cause the diaphragm 2 to be deflected in response to the drive signal. Small regions of the adhesive layer 8 and the second insulating layer 10 may be omitted during manufacture (or subsequently removed) to expose a part of the conductive layer for providing electrical contacts (not shown).

Figure 2:
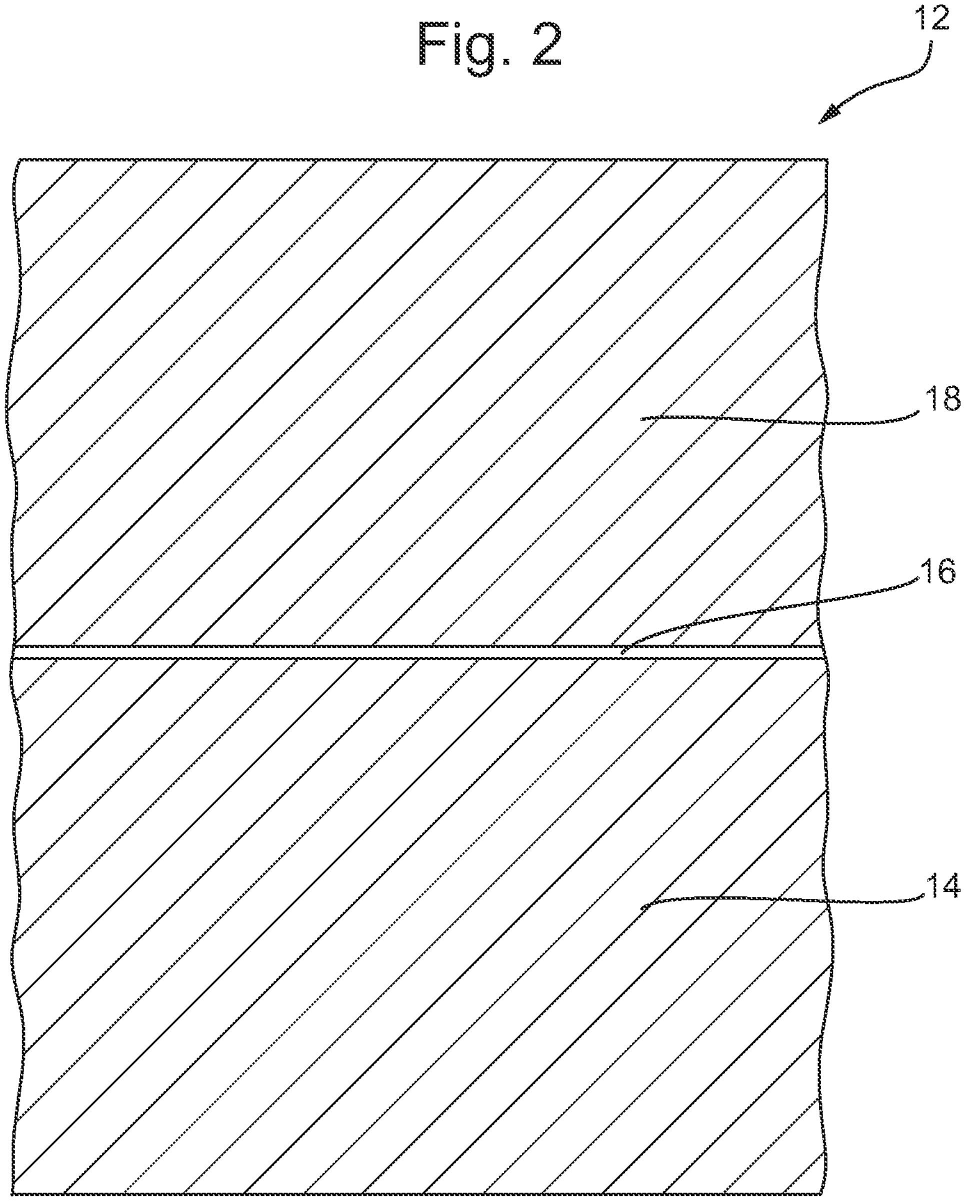
FIG. 2 shows a cross-section of a composite laminated diaphragm in accordance with a second embodiment of the present invention.

FIG. 2 shows a composite laminated diaphragm 12 in accordance with a second embodiment of the present invention. The diaphragm 12 comprises a first insulating layer 14 which serves as a substrate. The first insulating layer 14 is 7 μm thick and is made from biaxially-oriented polypropylene (BOPP). Similarly to the embodiment of FIG. 1, a conductive layer 16 is deposited on one surface of the first insulating layer 14. The conductive layer 16 is an 8 nm thick layer of gold deposited by vapour deposition.

In the contrast with the embodiment of FIG. 1, no adhesive layer is provided in this embodiment. Instead, a second insulating layer 18 is overlaid on the conductive layer 16, and the layers 16, 18 are bonded together using ultrasonic welding. The second insulating layer 18 is also 7 μm thick and made from biaxially-oriented polypropylene (BOPP). Electrical contacts (not shown) are provided in the same way as discussed above with reference to FIG. 1.

As mentioned previously, in embodiments with an adhesive layer the additional mass from the adhesive can provide internal damping which dampens resonant behaviour, e.g. at lower frequencies. In embodiments without the adhesive layer, the internal damping may therefore be less. However, the mass of the diaphragm is less compared with an equivalent diaphragm having an adhesive layer. The relatively lower mass results in resonant phenomena being higher in frequency, where they may either be sufficiently damped by the insulating layers, or they may be high enough in frequency that they are above the audio range of interest, e.g. above 20 kHz for audio applications (20 kHz being the typical upper range of human hearing).

As mentioned above, in embodiments having an adhesive layer, the adhesive may be selected such that the adhesive layer is air- and moisture-tight. In embodiments without an adhesive, this air- and moisture-tightness may instead be provided by bonding the insulating layers together with the conductive layer in an air- and moisture-tight way over the entire diaphragm (e.g. by ensuring the bonding is air- and moisture-tight around the entire perimeter of the diaphragm).

It will be appreciated that in the above two embodiments, specific materials and thicknesses are given, but in other embodiments, different thicknesses and/or different materials may be used. In addition, other variations (such as deposition methods, etc.) may be used. It is to be appreciated that the individual manufacturing steps (e.g. deposition/application of the conductive layer, application of the adhesive layer, overlaying of the second insulating layer, etc.) may be carried out in accordance with manufacturing techniques known per se in the art.

Figure 3:
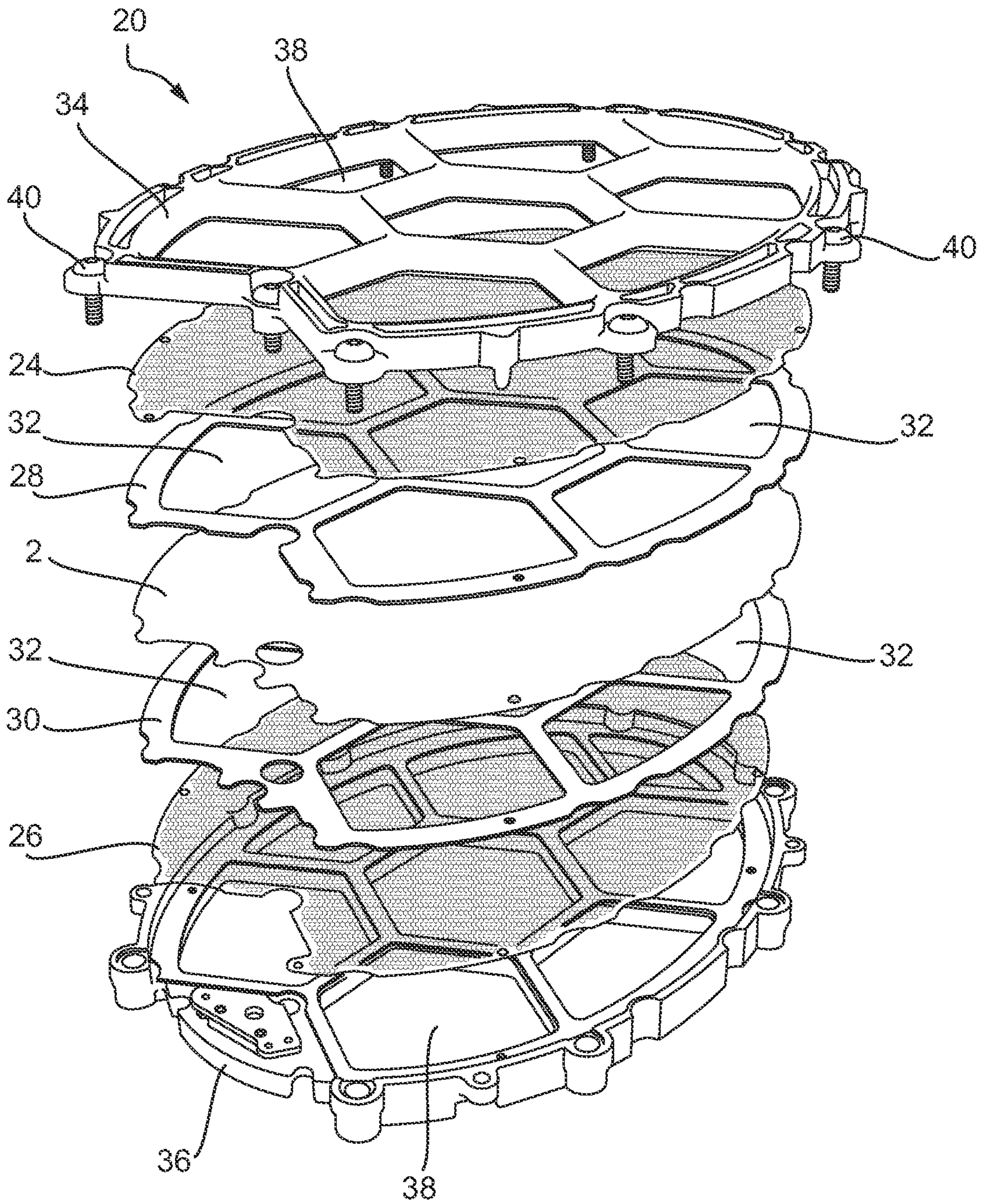
FIG. 3 shows an exploded view of an electrostatic transducer incorporating the diaphragm of the embodiment of FIG. 1.

FIG. 3 shows an exploded view of an electrostatic transducer 20 in accordance with an embodiment of the invention. The electrostatic transducer 20 comprises a composite laminated diaphragm 2 manufactured and having a structure as described above with reference to FIG. 1. The electrostatic transducer 20 further comprises a first stator 24 and a second stator 26. Each stator 24, 26 comprises a planar conductive plate with an array of holes provided therein.

The electrostatic transducer 20 also comprises a first spacer 28 which is positioned between the first stator 24 and diaphragm 2. A second spacer 30 is positioned between the second stator 26 and the diaphragm 2. Each spacer 28, 30 is provided with large apertures 32. The electrostatic transducer also comprises a first supporting frame 34 and a second supporting frame 36, each having large apertures 38, which correspond to and are aligned with the apertures 32 in the spacers.

When the electrostatic transducer is assembled, the diaphragm 2, spacers 28, 30 and stators 24, 26 are overlaid on each other and clamped together by the frames 34, 36, which are held together using screws 40. The spacers 28, 30 hold the stators 24, 26 in a spaced relation with the diaphragm 2 between them. Each spacer 28, 30 is 0.8 mm thick, so that the spacing between the diaphragm 2 and each of the stators 24, 26 is 0.8 mm.

In use, a DC bias of 1800V is applied to the conductive layer of the diaphragm 2. As discussed above, electrical contacts are provided on the conductive layer by removal or omission of a portion of the second insulating layer and adhesive layer from a region selected for applying the contact. The electrical contacts and voltage sources of the transducer are omitted from FIG. 3 for clarity.

To drive the movement of the diaphragm 2, a varying drive signal voltage corresponding to the desired audio signal is applied to the first stator 24, and a corresponding inverted signal applied to the second stator 26. The DC bias supplied to the diaphragm 2 creates an electrostatic field between the diaphragm and the stators, and the varying voltages applied to the stators results in a force on the diaphragm that causes it to vibrate, producing an acoustic wave corresponding to the drive signal voltage applied to the stators. The desired audio signal is thus reproduced.

Figure 4:
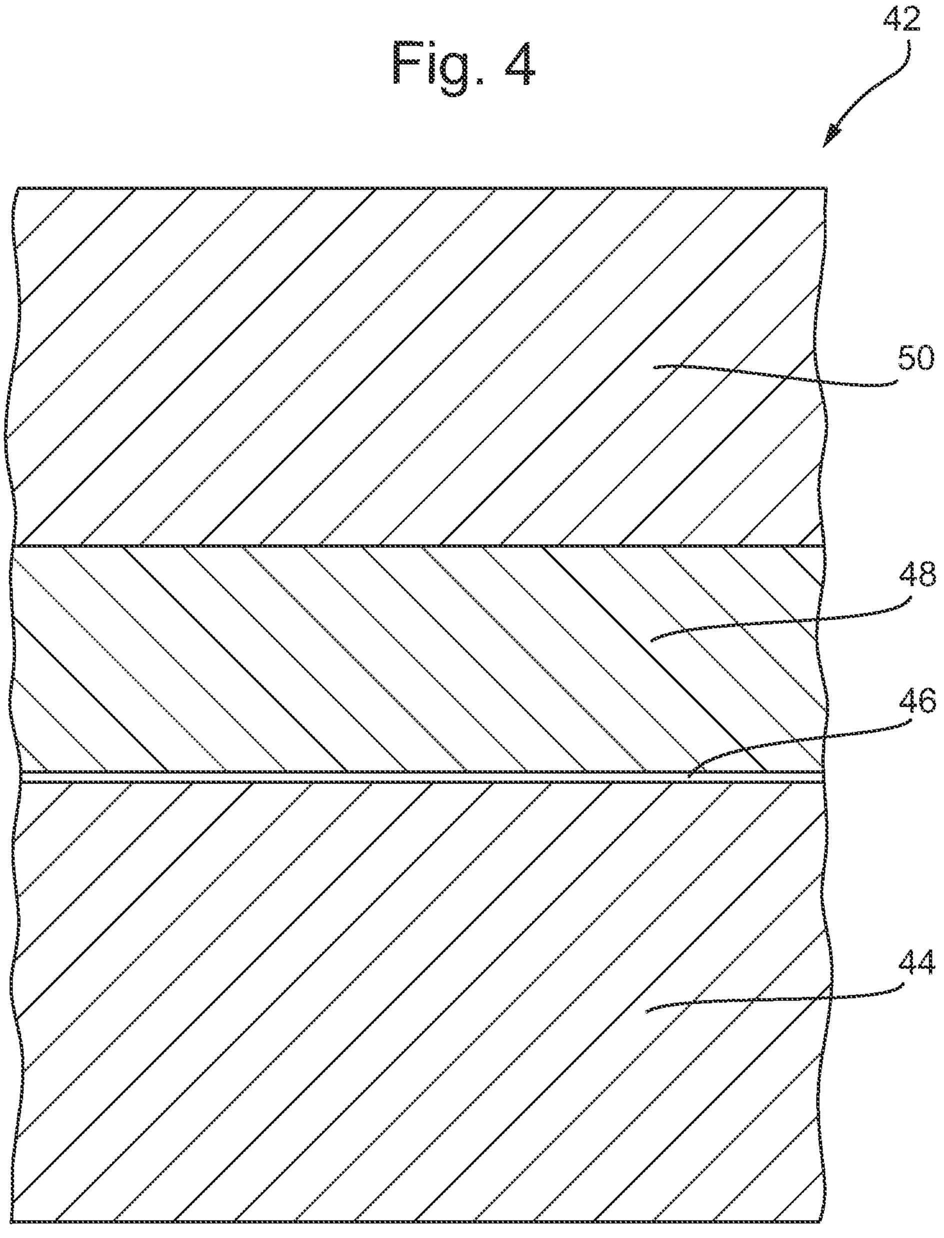
FIG. 4 shows a cross-section of a composite laminated diaphragm in accordance a fourth embodiment of the present invention.

FIG. 4 shows a cross-sectional view of a composite laminated diaphragm 42 in accordance with a fourth embodiment of a present invention. The diaphragm 42 comprises a first insulating layer 44 which serves as a substrate. The first insulating layer 44 is made from ULTEM® UTF120. In this example, the first insulating layer 44 is 5 μm thick, although other thickness are possible depending on acoustic performance requirements, e.g. 7 μm, 10 μm or other thicknesses.

A conductive layer 46 is deposited on a surface of the first insulating layer 44. The conductive layer 46 is a 25 nm thick layer of aluminium which is deposited on the first insulating layer 44 by sputtering or metal vapour deposition.

Overlaid on the conductive layer 46 is an epoxy-based adhesive layer 48 which is applied as a coating to the conductive layer 46 following plasma treatment of the conductive layer 46. The second insulating layer 50 is then rolled onto the adhesive layer 48, subjected to further plasma treatment, and pressure is applied using heated rollers to cause the layers to adhere together. The adhesive is cured at a temperature of 130° C. The second insulating layer 50 is also 5 μm thick and made from ULTEM® UTF120 (although similarly to the first insulating layer 44, other thickness are possible depending on acoustic performance requirements, e.g. 7 μm, 10 μm or other thicknesses). The adhesive layer is approximately 4 μm thick.

It will be appreciated that the layer thicknesses in FIG. 4 are not shown to scale.

It will be appreciated that only four embodiments of the invention have been described above, and that other embodiments and variations on the above embodiments are possible within the scope of the invention.

The invention claimed is:

1. A method of manufacturing an electrostatic transducer suitable for use in a motor vehicle, the method comprising manufacturing a composite laminated diaphragm and assembling the electrostatic transducer;

wherein manufacturing the composite laminated diaphragm comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer, wherein bonding the second insulating layer to the conductive layer comprises applying an adhesive layer to the conductive layer and overlaying the second insulating layer on the adhesive layer or applying an adhesive layer to the second insulating layer and overlaying the second insulating layer on the conductive layer; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

2. The method of claim 1, wherein the adhesive layer comprises an acrylic-based adhesive.

3. A method of manufacturing an electrostatic transducer suitable for use in a motor vehicle, the method comprising manufacturing a composite laminated diaphragm and assembling the electrostatic transducer;

wherein manufacturing the composite laminated diaphragm comprises:

providing a first insulating layer, wherein the first insulating layer comprises a sheet of uncharged insulating material, and wherein the first insulating layer has a thickness of 5 μm to 25 μm;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

4. A method of manufacturing an electrostatic transducer suitable for use in a motor vehicle, the method comprising manufacturing a composite laminated diaphragm and assembling the electrostatic transducer;

wherein manufacturing the composite laminated diaphragm comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material, and wherein the second insulating layer has a thickness of 5 μm to 25 μm;

bonding the second insulating layer to the conductive layer such that the second insulating layer extends over the conductive layer; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

5. A method of manufacturing an electrostatic transducer suitable for use in a motor vehicle, the method comprising manufacturing a composite laminated diaphragm and assembling the electrostatic transducer;

wherein manufacturing the composite laminated diaphragm comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer; and wherein the composite laminated diaphragm has at least one of a length that is greater than 1 cm and a width that is greater than 1 cm; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

6. The method of claim 5, wherein at least one of the first insulating layer and the second insulating layer is formed from a polymer material.

7. A method of manufacturing an electrostatic transducer suitable for use in a motor vehicle, the method comprising manufacturing a composite laminated diaphragm and assembling the electrostatic transducer;

wherein manufacturing the composite laminated diaphragm comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein at least one of the first insulating layer and the second insulating layer is formed from a material with a dielectric breakdown strength greater than 500V/mm; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

8. A method of manufacturing an electrostatic transducer suitable for use in a motor vehicle, the method comprising manufacturing a composite laminated diaphragm and assembling the electrostatic transducer;

wherein manufacturing the composite laminated diaphragm comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein at least one of the first insulating layer and the second insulating layer is formed from a material with a dielectric constant less than or equal to 3.9; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

9. The method of claim 5, wherein at least one of the first insulating layer and the second insulating layer is formed from a capacitor film.

10. A method of manufacturing an electrostatic transducer suitable for use in a motor vehicle, the method comprising manufacturing a composite laminated diaphragm from a composite material or film and assembling the electrostatic transducer;

wherein manufacturing the composite material or film comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein the composite material or film is substantially isotropic in respect of at least one of: a Young's Modulus of the composite material or film, a Coefficient of Thermal Expansion of the composite material or film, and a yield strength or tensile strength of the composite material or film; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

11. A method of manufacturing an electrostatic transducer suitable for use in a motor vehicle, the method comprising manufacturing a composite laminated diaphragm from a composite material or film and assembling the electrostatic transducer;

wherein manufacturing the composite material or film comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein the composite material or film has at least one parameter for which respective measured values thereof are matched between two or more layers of the composite material or film, wherein the at least one parameter is selected from the group consisting of a Coefficient of Thermal Expansion, a Young's modulus, a yield strength and a tensile strength; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

12. The method of claim 11, wherein at least one parameter measured for the composite material or film has a value or values which match(es) a corresponding value or corresponding values of the same parameter(s) measured for at least one of the first stator and the first spacer, wherein the at least one parameter includes one or more parameters selected from the group consisting of a Coefficient of Thermal Expansion, a Young's modulus, a yield strength and a tensile strength.

13. A method of manufacturing an electrostatic transducer suitable for use in a motor vehicle, the method comprising manufacturing a composite laminated diaphragm from a composite material or film and assembling the electrostatic transducer;

wherein manufacturing the composite material or film comprises:

providing a first insulating layer, wherein the first insulating layer comprises a sheet of uncharged insulating material;

providing a conductive layer on a surface of the first insulating layer;

providing a second insulating layer, wherein the second insulating layer comprises a sheet of uncharged insulating material;

bonding the second insulating layer to the conductive layer such that the second insulating layer extends over the conductive layer;

wherein the composite material or film has the following properties:

i) a glass transition temperature of at least 120° C.;

ii) at least one parameter for which respective measured values thereof are matched between two or more layers of the composite material or film, wherein the at least one parameter is selected from the group consisting of a Coefficient of Thermal Expansion, a Young's modulus, a yield strength and a tensile strength; and iii) a Surface Energy in the range of from 30 to 60 dynes/cm and/or a Polar Surface Energy greater than 12 dynes/cm; and wherein assembling the electrostatic transducer comprises:

providing a first conductive stator and a first insulating spacer;

securing the first conductive stator, the first insulating spacer and the diaphragm in a stack with the first insulating spacer between the first conductive stator and the diaphragm to provide a spacing of less than 1 mm between the first conductive stator and the diaphragm.

14. The method of claim 5, wherein the first and second insulating layers are both formed from a material which comprises, or which consists essentially of, a polyaryletheretherketone (PEEK), a polyetherimide (PEI), or a polyethylene-naphthalate (PEN).

15. An electrostatic transducer suitable for use in a motor vehicle comprising:

a first conductive stator;

a composite laminated diaphragm; and a first insulating spacer disposed between the first conductive stator and the diaphragm to provide a spacing of less than 1 mm between the first conductive stator and the diaphragm;

wherein the composite laminated diaphragm is manufactured from a composite material or film comprising:

a first insulating layer formed from a sheet of uncharged insulating material;

a conductive layer on a surface of the first insulating layer;

a second insulating layer extending over and bonded to the conductive layer, wherein the second insulating layer is formed from a sheet of uncharged insulating material;

wherein the composite material or film has at least one parameter for which respective measured values thereof are matched between two or more layers of the composite material or film, wherein the at least one parameter is selected from the group consisting of a Coefficient of Thermal Expansion, a Young's modulus, a yield strength and a tensile strength.

16. The method of claim 11, further comprising installing or using the electrostatic transducer in a motor vehicle.

17. The method of claim 11, further comprising:

providing a second conductive stator and a second insulating spacer;

securing the second conductive stator and the second insulating spacer in the stack with the second insulating spacer between the second conductive stator and the diaphragm to provide a spacing of less than 1 mm between the second conductive stator and the diaphragm.

18. The method of claim 5, wherein the conductive layer has a thickness that is less than 1% of a thickness of the composite laminated diaphragm.

19. The method of claim 5, wherein the conductive layer has a thickness of 5 nm to 100 nm.

* * * * *